(12) United States Patent
Dengler et al.

(10) Patent No.: US 12,024,475 B2
(45) Date of Patent: Jul. 2, 2024

(54) COMPOSITION FOR INORGANIC BINDERS

(71) Applicant: BASF SE, Ludwigshafen am Rhein (DE)

(72) Inventors: Jaochim Dengler, Trostberg (DE); Georg Daxenberger, Trostberg (DE); Pavlo Ilyin, Trostberg (DE); Fabian Niedermair, Trostberg (DE); Josef Hoermansperger, Trostberg (DE); Manfred Schuhbeck, Trostberg (DE)

(73) Assignee: BASF SE (DE)

( * ) Notice: Subject to any disclaimer, the term of this patent is extended or adjusted under 35 U.S.C. 154(b) by 1000 days.

(21) Appl. No.: 16/462,427

(22) PCT Filed: Nov. 17, 2017

(86) PCT No.: PCT/EP2017/079610
§ 371 (c)(1),
(2) Date: May 20, 2019

(87) PCT Pub. No.: WO2018/091659
PCT Pub. Date: May 24, 2018

(65) Prior Publication Data
US 2019/0367421 A1 Dec. 5, 2019

(30) Foreign Application Priority Data
Nov. 21, 2016 (EP) .................................... 16199767

(51) Int. Cl.
*C04B 40/00* (2006.01)
*C04B 14/06* (2006.01)
(Continued)

(52) U.S. Cl.
CPC .......... *C04B 40/0042* (2013.01); *C04B 14/06* (2013.01); *C04B 24/161* (2013.01);
(Continued)

(58) Field of Classification Search
CPC ... C04B 40/0042; C04B 28/147; C04B 28/04; C04B 24/30; C04B 24/161; C04B 14/06
See application file for complete search history.

(56) References Cited

U.S. PATENT DOCUMENTS

| 4,657,593 A | 4/1987 | Aignesberger et al. |
| 2006/0169183 A1* | 8/2006 | Waser ..................... C04B 28/06 106/806 |

(Continued)

FOREIGN PATENT DOCUMENTS

| CN | 101549973 A | 10/2009 |
| DE | 1 671 017 | 9/1971 |

(Continued)

OTHER PUBLICATIONS

English machine translation of JP 2015-157723A. (Year: 2015).*
(Continued)

*Primary Examiner* — John E Uselding
(74) *Attorney, Agent, or Firm* — Faegre Drinker Biddle & Reath LLP

(57) ABSTRACT

The invention relates to a composition for inorganic binders, comprising at least one ketone-formaldehyde condensation product on the basis of a cyclic ketone and at least one anionic or nonionic surfactant and/or a thickener, and also to building material mixtures which comprise this composition, and to the use of the composition. The compositions improve the applications properties of the binder formulations.

9 Claims, 1 Drawing Sheet

(51) Int. Cl.
*C04B 24/16* (2006.01)
*C04B 24/30* (2006.01)
*C04B 28/04* (2006.01)
*C04B 28/14* (2006.01)
C04B 103/00 (2006.01)
C04B 103/40 (2006.01)
C04B 103/44 (2006.01)
C04B 111/00 (2006.01)

(52) U.S. Cl.
CPC ............. *C04B 24/30* (2013.01); *C04B 28/04* (2013.01); *C04B 28/147* (2013.01); C04B 2103/0045 (2013.01); C04B 2103/0079 (2013.01); C04B 2103/402 (2013.01); C04B 2103/406 (2013.01); C04B 2103/44 (2013.01); C04B 2111/00517 (2013.01)

(56) References Cited

U.S. PATENT DOCUMENTS

| | | | |
|---|---|---|---|
| 2008/0202415 A1* | 8/2008 | Miller | B01F 23/53 118/708 |
| 2015/0344368 A1* | 12/2015 | Hesse | C04B 24/16 524/5 |
| 2016/0229748 A1 | 8/2016 | Gehrig et al. | |

FOREIGN PATENT DOCUMENTS

| | | |
|---|---|---|
| DE | 23 41 923 A1 | 3/1975 |
| DE | 38 25 530 A1 | 2/1989 |
| DE | 10 2007 027 470 A1 | 12/2008 |
| EP | 0 078 938 A1 | 5/1983 |
| EP | 0 163 459 A1 | 12/1985 |
| EP | 0 816 300 A2 | 1/1998 |
| JP | 2015157723 A * | 9/2015 ............ C04B 22/08 |
| WO | WO 99/37594 A1 | 7/1999 |
| WO | WO 2008/040726 A1 | 4/2008 |
| WO | WO 2015/039890 A1 | 3/2015 |

OTHER PUBLICATIONS

Pourchez et al. Impact of cellulose ethers on cement paste microstructure. HAL Open Science. HAL Id: hal-00297256. (Year: 2008).*
Peschard et al. Effect of polysaccharides on the hydration of cement paste at early ages. Cement and Concrete Research 34 (2004) 2153-2158. (Year: 2004).*
International Search Report dated Feb. 9, 2018 in PCT/EP2017/079610 filed Nov. 17, 2017.
Extended European Search Report dated May 12, 2017 in Patent Application No. 16199767.1 (with English translation of categories of cited references).
Lei, L. et al. "Synthesis, working mechanism and effectiveness of a novel cycloaliphatic superplasticizer for concrete" Cement and Concrete Research, vol. 42, No. 1. 2012, pp. 118-123.

* cited by examiner

COMPOSITION FOR INORGANIC BINDERS

The invention relates to a composition for inorganic binders, to building material mixtures which comprise this composition, and to the use of the composition.

It is known practice to use ketone resins in the form of compositions in mortar.

DE 2 341 923 A1, for instance, describes water-soluble condensation products of cycloalkanones with formaldehyde and sodium sulfite as plasticizers for mortars. Using these mortars, especially for screeds and troweling compounds, results in high strength, low porosity, and hence high imperviosity. L. Lei and J. Planck (Cement and Concrete Research, 42, 118-123, 2012) describe how cyclohexanone resins of high molecular weight ($M_w$>220.000 g/mol) in cement mortar behave similarly to beta-naphthalenesulfonic acid-formaldehyde condensates (BNS) and have a stabilizing effect even in the presence of clay. EP 78938A1 describes thermostable condensation products of aldehydes and ketones that contain acid groups and are suitable as dispersants for producing flowable concrete or self-leveling screed and for the plasticizing of deep-well cement mixtures. WO 2015/039890 describes a gypsum containing slurry comprising foam and a ketone resin, such as a cyclohexanone or acetone resin, as dispersants for improving the stability of clay-containing plasterboard. For preparing the foam tensides are used as foaming agents and foam stabilizers in low amounts based on the amount of resin.

CN 101549973 A describes a superplasticizer composition comprising a naphthalene sulfonic acid formaldehyde condensate, a sulfonated aldehyde ketone condensate or a sulfamate formaldehyde condensate as water-reducing agent. The composition may additionally contain a viscosity adjusting agent, such as a cellulose ether, and an air-entraining agent, such as sodium dodecyl benzene sulfonate. EP 816300, EP 163 459 A1, and WO 99/37594 disclose the use of acetone formaldehyde sulfite condensates in well cement compositions. WO 2008/040726, DE 38 25 530 A1 and EP 078 938 A1 disclose the use of acetone formaldehyde sulfite condensates as water retention agents in building material compositions.

However, using the ketone resins in building material mixtures which comprise inorganic binders results in building material formulations which are unsatisfactory in terms of their applications properties, particularly in terms of their air pore quality and hence also their surface quality. The quantity and size of air pores and their stability over time are critical to the smoothness, tackiness, and holdout of the building material formulations, such as rendering and troweling compounds.

It is therefore an object of the present invention to provide a composition for inorganic binders that leads to improved applications properties, especially improved air pore quality.

This object is achieved by means of a composition for inorganic binders, comprising
 a) at least one ketone-formaldehyde condensation product containing at least one acidic group selected from a phosphono, sulfite, sulfino, sulfo, sulfamido, sulfoxy, sulfoalkyloxy, sulfinoalkyloxy, and phosphonooxy group, wherein the ketone is selected from ketones of the formula $R^1$—CO—$R^2$, in which $R^1$ and $R^2$ taken together are a $C_3$-$C_6$ alkylene radical which may contain one or more substituents selected from an amino, hydroxyl, $C_1$-$C_4$ alkoxy or $C_1$-$C_4$ alkoxycarbonyl group, and
 b) at least one anionic or nonionic surfactant and/or at least one thickener,
 wherein the weight ratio of component (a) to component (b) is in the range from 3:1 to 1:10.

Ketone-formaldehyde condensation products having acidic groups and their preparation are known, from EP 78 938A1 and WO 2015/039890, for example. The content of these publications in terms of the ketone-formaldehyde condensation products is hereby referenced in full.

The ketone-formaldehyde condensation products employed in accordance with the invention have in general a molecular weight $M_w$ in the range from 2500 to 100 000 g/mole, preferably 10 000 to 50 000 g/mole. The molecular weight was determined by gel permeation chromatography (GPC) using the following method: column combination: Shodex OH-Pak SB 804 HQ and OH-Pak SB 802.5 HQ from Showa Denko, Japan; eluents: 80 vol % aqueous solution of $HCO_2NH_4$ (0.05 mol/l) and 20 vol % MeOH; injection volume 100 μl; flow rate 0.5 ml/min). Calibration of molecular weight was carried out using standards from PSS Polymer Standard Service, Germany. Poly(styrenesulfonate) standards were used for the UV detector, and poly(ethylene oxide) standards for the RI detector. The results of the RI detector were used for determining the molecular weight.

In one embodiment the ketone is a compound with the formula $R^1$—CO—$R^2$, in which $R^1$ and $R^2$ taken together are a $C_3$-$C_6$ alkylene radical, which may contain one or more substituents selected from an amino, hydroxyl, $C_1$-$C_4$ alkoxy or $C_1$-$C_4$ alkoxycarbonyl group. Preferred aliphatic ketones are those of the formula above in which $R^1$ and $R^2$ may be identical or different and are a $C_1$-$C_4$ alkyl, or cyclic ketones of the formula

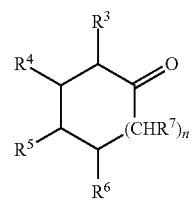

in which $R^3$ to $R^7$, which may be identical or different, are H or $C_1$-$C_4$ alkyl, and n is 0, 1 or 2.

Examples of ketones are cyclohexanone, 4-methylcyclohexanone, cyclopentanone, cycloheptanone, preferably cyclohexanone.

In one embodiment the acidic group is selected from a phosphono, sulfite, sulfino, and sulfo group. The sulfite group is preferred.

In another embodiment the ketone-formaldehyde condensation product is the cyclohexanone/formaldehyde/sulfite condensation product.

The ketone-formaldehyde condensation products are prepared by condensation of the corresponding ketone with formaldehyde and a salt of the parent acid that corresponds to the acidic group, as described in EP78938 or WO 2015/039890, for example. The ketone:formaldehyde:acid salt molar ratio is generally in the range of 1:2-3:0.33-1.

In another embodiment, the thickener is selected from inorganic or polymeric thickeners. Examples of inorganic thickeners are phyllosilicates (bentonites or hectorites) or hydrated $SiO_2$ particles.

In another embodiment the thickener is selected from polysaccharide derivatives and (co)polymers having a weight-average molecular weight $M_w$ of more than 500 000 g/mole, more particularly more than 1 000 000 g/mole.

In another embodiment the thickener is selected from cellulose ethers, starch ethers, and (co)polymers which comprise structural units of nonionic (meth)acrylamide monomers and/or sulfonic acid monomers and, optionally, of further monomers. Preferred are cellulose ethers and starch ethers.

Suitable cellulose ethers are alkylcelluloses such as methylcellulose, ethylcellulose, propylcellulose, and methylethylcellulose; hydroxyalkylcelluloses such as hydroxyethylcellulose (HEC), hydroxypropylcellulose (HPC), and hydroxyethylhydroxypropylcellulose; alkylhydroxyalkylcelluloses such as methylhydroxyethylcelluose (MHEC), methylhydroxypropylcelluose (MHPC), and propylhydroxypropylcellulose; and carboxylated cellulose ethers, such as carboxymethylcellulose (CMC). Preferred are the nonionic cellulose ether derivatives, especially methylcellulose (MC), hydroxypropylcellulose (HPC), hydroxyethylcellulose (HEC), and ethylhydroxyethylcellulose (EHEC), and particularly preferred are methylhydroxyethylcellulose (MHEC) and methylhydroxypropylcellulose (MHPC). The cellulose ether derivatives are each obtainable by corresponding alkylation and alkoxylation of cellulose and are available commercially.

Suitable starch ethers are nonionic or cationic starch ethers, such as hydroxypropyl starch, hydroxyethyl starch, and methylhydroxypropyl starch. Hydroxypropyl starch is preferred. Other suitable thickeners are microbially produced polysaccharides such as welan gum and/or xanthans, and naturally occurring polysaccharides such as alginates, carrageenans, and galactomannans. These may be obtained from corresponding natural products by extractive methods, such as from algae in the case of alginates and carrageenan and from carob kernels in the case of galactomannans.

(Co)polymers having a weight-average molecular weight $M_w$ of more than 500 000 g/mol, more preferably more than 1 000 000 g/mol, may be prepared (preferably by a radical polymerization) from nonionic (meth)acrylamide monomers and/or sulfonic acid monomers. In one embodiment the monomers are selected from acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or styrenesulfonic acid, 2-acrylamido-2-methylpropanesulfonic acid, 2-methacrylamido-2-methylpropanesulfonic acid, 2-acrylamidobutanesulfonic acid and/or 2-acrylamido-2,4,4-trimethylpentanesulfonic acid or the salts of said acids. The (co)polymers preferably contain more than 50 mol % and more preferably more than 70 mol % of structural units which derive from nonionic (meth)acrylamide monomers and/or sulfonic acid monomers. Other structural units which may be present in the copolymers are derived, for example, from the monomers (meth)acrylic acid, esters of (meth)acrylic acids with branched or unbranched $C_1$-$C_{10}$ alcohols, vinyl acetate, vinyl propionate and/or styrene.

In another embodiment the thickener is selected from methylcellulose, hydroxypropylcellulose, hydroxyethylcellulose, ethylhydroxyethylcellulose, hydroxypropyl starch, hydroxyethyl starch, methylhydroxypropyl starch, and (co)polymers comprising structural units derived from acrylamide, methacrylamide, N,N-dimethylacrylamide, 2-acrylamido-2-methylpropanesulfonic acid, and, optionally, (meth)acrylic acid, esters of (meth)acrylic acids with branched or unbranched $C_1$-$C_{10}$ alcohols, vinyl acetate, vinyl propionate and/or styrene.

In another embodiment the composition comprises at least one surfactant as component (b).

In another embodiment the composition comprises as component (b) at least one thickener and at least one surfactant.

The surfactant comprises more particularly an anionic or nonionic surfactant, preferably an anionic surfactant. In one embodiment the anionic surfactants are selected from $C_8$-$C_{18}$ alkyl sulfates, $C_8$-$C_{18}$ alkyl ether sulfates, $C_8$-$C_{18}$ alkylsulfonates, $C_8$-$C_{18}$ alkylbenzenesulfonates, $C_8$-$C_{18}$ α-olefinsulfonates, $C_8$-$C_{18}$ sulfosuccinates, α-sulfo-$C_8$-$C_{18}$ fatty acid disalts, and $C_8$-$C_{18}$ fatty acid salts. The anionic surfactants are generally in the form of alkali metal or alkaline earth metal salts, more particularly of sodium salts. Examples of anionic surfactants are sodium lauryl sulfate, sodium myristyl sulfate, sodium cetyl sulfate, sodium sulfates of ethoxylated lauryl alcohol or myristyl alcohol having a degree of ethoxylation of 2 to 10, lauryl- or cetylsulfonate sodium salt, hexadecylbenzenesulfonate sodium salt, C14/C16 α-olefinsulfonate sodium salt, lauryl- or cetylsulfosuccinate sodium salt, disodium 2-sulfolaurate, or sodium stearate, and mixtures thereof.

In one embodiment the nonionic surfactants are selected from $C_8$-$C_{18}$ fatty alcohol ethoxylates, block copolymers of ethylene oxide and propylene oxide, and $C_8$-$C_{18}$ alkylpolyglycosides, and mixtures thereof. Examples thereof are the block copolymers available commercially, such as the Pluronics® (poloxamers).

In another embodiment the composition comprises as component (a) a cyclohexanone/formaldehyde/sulfite condensation product and as component (b) an α-sulfo-$C_8$-$C_{18}$ fatty acid disalt In another embodiment the composition comprises as component (a) a cyclohexanone/formaldehyde/sulfite condensation product and as component (b) mixture of an α-sulfo-$C_8$-$C_{18}$ fatty acid disalt and a $C_8$-$C_{18}$ alkyl ether sulfates In another embodiment the composition comprises as component (a) a cyclohexanone/formaldehyde/sulfite condensation product and as component (b) mixture of an α-sulfo-$C_8$-$C_{18}$ fatty acid disalt and a block copolymers of ethylene oxide and propylene oxide Component (a) generally takes the form of an aqueous solution. Added to this solution may be component (b), likewise in the form of an aqueous solution or as a solid (if component (b) is a thickener), more particularly in powder form. Alternatively component (a) may be added in powder form to an aqueous solution of component (b).

In one embodiment the weight ratio of component (a) to component (b) is selected from one of the following ranges:
2:1 to 1:10,
1:1 to 1:6,
1:1 to 1:4,
1:2 to 1:6, and
1:2 to 1:4.

An aqueous solution comprising components (a) and (b) may be dried in a customary way, such as by spray drying, producing the composition in powder form. In one embodiment the drying is accomplished by co-spray drying—in other words, a solution of component (a) and a solution of component (b) are introduced separately but simultaneously into the spray drier. If component (b) comprises thickener and surfactant, they may be introduced together in one solution or as separate solutions into the spray drier.

The invention also relates to a building material mixture which comprises the composition of the invention and one or more inorganic binders, more particularly a hydraulic and/or latent hydraulic binder, such as cement, preferably Portland cement, slag, preferably granulated blast furnace slag, flyash, finely ground silica, metakaolin, natural pozzolans, calcined oil shale, calcium sulfoaluminate cements and/or calcium aluminate cements. The inorganic binder may also, however, be a nonhydraulic binder, such as gypsum, α- and β-hemihydrate, calcium sulfate anhydrite, lime hydrate or calcium oxide. Preferred are hydraulic and/or latent hydraulic binders, such as cement, preferably Portland cement. The building material mixtures are employed in particular for building material formulations, such as mortars, rendering and troweling compounds. The components (a) and (b) of the composition may be added simultaneously or sequentially in any order to the building material mixture or building material formulation. These components (a) and (b) may be added in the form of an aqueous solution and/or solid, more particularly in the form of powder.

In one embodiment the composition comprises a hydrophobizing agent.

Suitable hydrophobizing agents for inorganic building materials are wax emulsions which comprise, for example, polyvinyl alcohols or styrene-(meth)acrylic acid copolymers. Also useful are fatty acids (sodium oleate and calcium stearate or zinc stearate). Besides the metal soaps, silicone-resin based hydrophobizing agents are also used. For render and mortar mixtures, finely divided methylsilsesquioxanes in powder form are predominantly employed. Hydrophobizing agents are added to the mortar preferably as powders in amounts of 0.1-1%, based on binder.

In another embodiment the composition comprises a superabsorbent. Preferred here are superabsorbents that are robust toward salt. They are described in DE102007027470 A1.

The effect of the compositions or building material mixtures of the invention is to improve the air pore quality, by increasing the number of air pores—especially of small air pores—in the building material formulation and the stability of these pores over time. As a result, the building material formulations become smoother, of easier consistency, fluffier, and less sticky, possess improved after-thickening behavior, and can be processed more effectively—including over a relatively long time period, and have improved holdout over a relatively long time period. The compositions of the invention therefore result in improved applications properties.

The invention therefore also relates to the use of compositions as additive for building material mixtures and also to the use of the compositions and/or building material mixtures for improving the applications properties, particularly for improving the air pore stability and the rheological properties, of building material formulations.

The examples which follow illustrate the invention without limiting it.

A cyclohexanone resin (CHR) was used which was prepared as follows (corresponding to polymer 5 in table 1 of WO 2015/039890):

a reaction vessel was charged with 40 g of water and the pH was adjusted to 10. Added to this initial charge was 0.25 mol of sodium sulfite and, lastly, 0.51 mol of cyclohexanone was added dropwise with stirring, the temperature climbing to 30-32° C. This was followed by heating to around 60° C. 1.5 Mol of formaldehyde was slowly added dropwise, at a rate such that the temperature did not exceed 70° C. After the end of addition, the temperature was raised to 90° C. and the mixture was heated for a further 3 hours until the molecular weight $M_w$ reached 18 000. The molecular weight was determined by GPC and viscosimetry. The residual formaldehyde content was <10 ppm.

Thickener: methylhydroxyethylcellulose (MC) Tylose FL 15002

Surfactants:
Surfactant 1: C14/C16 α-olefinsulfonate sodium salt (Hostapur OSB)
Surfactant 2: sodium lauryl sulfate (Texapon K12P)
Surfactant 3: disodium alpha-sulfo-C12/14 fatty acid (Texapon SFA).
Surfactant 4: ethylene/propylene copolymer (Pluronic PE 9400)
Surfactant 5: alkyl ether sulate (Vinapor Gyp 2620)

The compositions listed in table 1 were produced by mixing the corresponding aqueous solutions of the components. The solutions were dried using a Mobile Minor MM-I spray drier from GEA Niro. Drying took place by means of a two-fluid nozzle at the top of the tower. Drying was carried out with nitrogen, which was blown from top to bottom in cocurrent with the material for drying, using 80 kg/h drying gas. The temperature of the drying gas at the tower entry was 220° C. The feed rate of the material being dried was adjusted such that the output temperature of the drying gas at the tower exit was 100° C. The powder discharged from the drying tower with the drying gas was separated from the drying gas by means of a cyclone.

TABLE 1

| Composition No. | Component a) | Component b) | CHR:surfactant ratio |
|---|---|---|---|
| 1 | CHR | Surfactant 1 | 1/1 |
| 2 | CHR | Surfactant 1 | 1/2 |
| 3 | CHR | Surfactant 1 | 1/4 |
| 4 | CHR | Surfactant 2 | 1/1 |
| 5 | CHR | Surfactant 2 | 1/2 |
| 6 | CHR | Surfactant 2 | 1/4 |
| 7 | CHR | Surfactant 3 | 1/1 |
| 8 | CHR | Surfactant 3 | 1/2 |
| 9 | CHR | Surfactant 3 | 1/4 |
| 10 | CHR | | 1/0 |
| C1 | — | Surfactant 1 | 0/1 |
| C2 | — | Surfactant 2 | 0/1 |
| C3 | — | Surfactant 3 | 0/1 |
| C4 | Melment F10 | | |

Melment F10 is a sulfonated melamine-formaldehyde resin (DE1671017A1).

The compositions were used in a test mixture whose formula was as follows:
Milke cement CEM I 52.5 N 20%
Strobel fused silica BCS 319 80%
Water 20%

The mixture was prepared by stirring as per DIN EN 998-1: cement, silica, thickener, and the mixtures listed in table 1 were charged to a mortar mixture (Rilem mixer) according to DIN EN 196-1 and admixed with the stated amount of water. Stirring then took place at a low setting (140 rpm) for 90 seconds, followed by a 90-second pause and then by further stirring at a high setting (285 rpm) for 60 seconds.

The resulting mortar was tested for air pore content (by DIN EN 998-1), flow properties (by DIN EN 998-1) and fluffiness. Fluffiness referred to a loose, easy, soft, and silky tactile quality to the mortar. The fluffiness is also manifest in particularly easy spreadability of the mortar. The fluffiness was assessed by a parallel and direct comparison with the prior art. Here, two mixtures were produced simultaneously and spread by trowel onto a wooden plate. Based on the fluffiness of the material, the person applying it rates its quality in a range from −3 to +3. A rating of 0 here corresponds to characteristics identical to those of the comparison specimen. A rating of up to +3 corresponds to improvement; a rating of down to −3 corresponds to a deterioration. FIG. 1 (standard without CHR) and 2 (improved mortar with CHR) visualize the rheological properties. At relatively high fluffiness, the surface texture is more attractive and more even. Break-up on the trowel is significantly reduced in FIG. 2. As a result, it becomes much easier to spread the mortar.

The evaluation is made immediately after stirring and after 30 minutes. The difference in the value after 30 minutes is described in the table as stability over time. As the comparative example and prior art resin, Melment F10 is used.

TABLE 2

Figure 1:
FIG. 1 shows a photograph of standard mortar without CHR.
Figure 2:
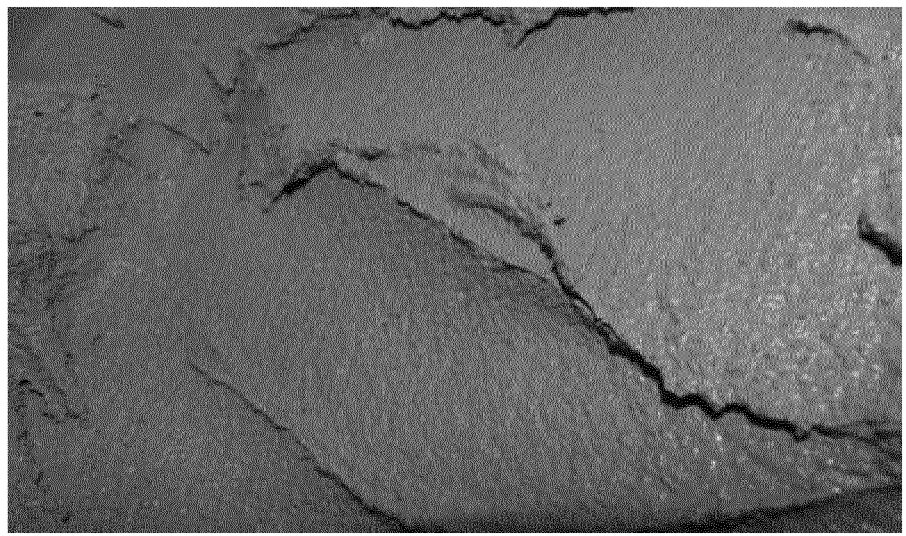
FIG. 2 shows a photograph of mortar according to the invention with CHR.

| Experiment # | Composition | Amount added [% based on dry mortar] | Amount of Tylose FL 15002 [methylhydroxy-ethylcellulose] | Air content [%] | Change in density after 30 min [%] | Overall impression | Fluffiness | Stability over time |
|---|---|---|---|---|---|---|---|---|
| Comparison specimen | None | — | 0.1 | 29 | 8.5 | 0 | 0 | 0 |
| 1 | C3 | 0.028 | 0.1 | 43 | 4.4 | 0.5 | 0.5 | 0 |
| 2 | C4 | 0.03 | 0.1 | 27 | 5.5 | −1 | −1 | −1 |
| 3 | C4 | 0.1 | 0.1 | 27 | 4.1 | −1 | −1 | −1 |
| 4 | 2 | 0.03 | 0.1 | 37 | 3.6 | 1.5 | 1 | 1 |
| 5 | 7 | 0.06 | 0.1 | 38 | 4.8 | 2.5 | 2.5 | 2 |
| 6 | 9 | 0.036 | 0.1 | 42 | 2.6 | 3 | 3 | 2 |
| 7 | 10 | 0.03 | 0.1 | 29 | 6.1 | 0.5 | 0.5 | 0 |
| 8 | 10 + C3 | 0.03 + 0.06 | 0.1 | 42 | 2.6 | 2.5 | 2.5 | 1.5 |
| 9 | 10 + C3 | 0.03 + 0.03 | 0.1 | 39 | 4.8 | 2 | 2 | 0.5 |
| 10 | 4 | 0.3 | 0.1 | 32 | 5.0 | 1.0 | 1 | 1 |
| 11 | 1 | 0.03 | 0.1 | 43 | 4.0 | 1.0 | 1 | 1 |
| 12 | 3 | 0.03 | 0.1 | 41 | 3.7 | 2.5 | 2 | 1.5 |
| 13 | 5 | 0.03 | 0.1 | 46 | 5.4 | 1.5 | 1 | 2 |
| 14 | 6 | 0.03 | 0.1 | 40 | 4 | 1.5 | 1 | 2.5 |
| 15 | 8 | 0.03 | 0.1 | 40 | 4.0 | 2.5 | 2.5 | 2 |
| 16 | 7 | 0.03 | 0 | 23 | 0.3 | 1 | 1 | 0 |
| 17 | 9 | 0.03 | 0 | 22 | 0.7 | 1 | 1 | 0 |
| 18 | 1 | 0.03 | 0 | 29 | 1.2 | 1 | 1 | 0.5 |

It is evident that the compositions of the invention result in a higher air content and a lower mortar density. Furthermore, mortar fluffiness and stability are improved. All in all, the overall impression is improved.

The next examples show the advantage of formulations of the ketone resin with two different surfactants.

The mortar composition and mixing procedure was the same as above.

The Additive mix is summarized in Table 3. The haptic measurements in this series of experiment summarized in Table 4 are referenced against experiment 19

TABLE 3

| Experiment | CHR | Surfactant 3 | Surfactant 4 | Surfactant 5 |
|---|---|---|---|---|
| 19 | 1 | 1 | | |
| 20 | 1 | 1 | 0.4 | |
| 21 | 1 | 1 | | 0.4 |

TABLE 4

| Experiment # | Amount added [% based on dry mortar] | Air content [%] | Overall impression | Fluffiness | Stability over time |
|---|---|---|---|---|---|
| 19 | 0.36 | 16.8 | 0 | 0 | 0 |
| 20 | 0.36 | 18.5 | 1.5 | 2 | 1.5 |
| 21 | 0.36 | 17.3 | 0.75 | 1 | 0.75 |

Further application suitability was tested in a TICS reinforcing mortar whose composition was as follows:

Milke cement CEM I 52.5 N 25%

Fused silica BCS 319 75%

MHEC 15 000 0.08%

Baerophob ECO 0.35%

Starvis SE 35 F 0.050

Starvis S 5514 F 0.34%

Water 20%

Starvis SE 35 is a starch ether available commercially from BASF SE. Starvis S 5514 F is a water-swellable, high molecular mass polymer (superabsorbent) and is likewise available from BASF SE. Baerophob ECO is a complex metal soap for hydrophobizing, available from Bärlocher GmbH. The reinforcing mortar was mixed as a dry mortar and applied with a PFT-G4 render machine; application suitability was evaluated visually and on a tactile basis. The results are reported in table 3 (rating of +3 to −3 as indicated above, reference=0).

TABLE 5

| Fresh mortar properties With G4 machine tests, water quantities constant | Reference without CHR | Reference + 0.03 CHR |
|---|---|---|
| Immediate evaluation in pail: smoothness, stickiness, overall appearance, after-thickening | 0 | 2 |
| Evaluation in pail after 30 min: smoothness, stickiness, overall appearance, initial thickening | 0 | 2 |
| Initial spray behavior/spray pattern/holdout | 0 | 3 |
| Evaluation after initial spraying: ease of working, stickiness on tooling | 0 | 2 |
| Evaluation of mesh insertion after 30 min | 0 | 2 |
| Evaluation of reworking/initial working after 30 min | 0 | 2 |
| Stickiness after 30 min | 0 | 3 |
| Overall evaluation | 0 | 2.3 |

Table 5 shows that the composition of the invention composed of cyclohexanone-formaldehyde resin and thickener (MHEC) leads to a significant improvement in application suitability.

Further application suitability is shown using a hand-applied plaster render. The composition selected was as follows:

750 g of FGD β-hemihydrate Schwarze Pumpe 210 g of crushed limestone sand 0-3 mm (Heck Wallsystems)

10 g of Bachl PZ1 Perlite (0-1 mm)

30 g of lime hydrate 2 g of BCZ tartaric acid 0.15 g of Texapon K12P 1.9 g of Culminal C4053

0.2 g of Starvis SE35F 490 g of water

The plaster render dry mortar was prepared by stirring with water in a Kitchen Aid, and the application suitability was evaluated visually. The results are shown in table 6.

TABLE 6

| Fresh mortar properties | Reference | Reference + CHR |
|---|---|---|
| Immediate evaluation in pail[1] | 0 | 2 |
| Evaluation in pail after 30 min[1] | 0 | 2 |
| Ease of working, stickiness on the tooling | 0 | 3 |
| Evaluation of after working/initial working after 30 min | 0 | 2 |
| Stickiness after 30 min | 0 | 3 |
| Overall evaluation | 0 | 2.4 |

[1]smoothness, stickiness, overall appearance, after-thickening

Table 6 as well shows that the composition of the invention composed of cyclohexanone-formaldehyde resin and thickener (MHEC) leads to a significant improvement in application suitability.

The invention claimed is:

1. A composition, comprising
   (a) at least one cyclohexanone/formaldehyde/sulfite condensation product, and
   (b) at least one anionic or nonionic surfactant comprising an α-sulfo-C8-C18 fatty acid disalt and at least one thickener wherein the thickener is a cellulose ether, and
   wherein a weight ratio of component (a) to component (b) is in the range from 3:1 to 1:17 8/9, and wherein a weight ration of the component (a) to the thickener is in the range from 0.3:1 to 1:13 8/9.

2. The composition according to claim 1, wherein the weight ratio of component (a) to component (b) is in the range from 3:1 to 1:5.

3. The composition according to claim 2, wherein the weight ratio of component (a) to component (b) is in the range from 1:2 to 1:5.

4. The composition according to claim 1, which is in powder and/or granule form.

5. The composition according to claim 4, obtained by co-spray drying of a mixture comprising components (a) and (b).

6. A building material mixture, comprising the composition according to claim 1 and an inorganic binder.

7. The building material mixture according to claim 6, wherein the inorganic binder is a hydraulic or latent hydraulic binder or a mixture thereof.

8. A method of improving application properties of a building material formulation, the method comprising: adding the composition according to claim 1 to the building material mixture comprising an inorganic binder.

9. A composition, comprising
   (a) at least one cyclohexanone/formaldehyde/sulfite condensation product, and
   (b) at least one anionic or nonionic surfactant comprising an α-sulfo-C8-C18 fatty acid disalt and at least one thickener, wherein the thickener is a cellulose ether, and
   wherein a weight ratio of component (a) to component (b) is in the range from 3:1 to 1:10, and
   wherein a weight ratio of component (a) to the thickener is in the range from 1.5:1 to 1:16 2/3.

* * * * *